United States Patent [19]

Öhberg

[11] Patent Number: 4,944,809
[45] Date of Patent: Jul. 31, 1990

[54] METHOD AND APPARATUS FOR VACCUM CLEANING A PILE OF MINERAL WOOL PLATES

[75] Inventor: Ingemar Öhberg, Skövde, Sweden

[73] Assignee: Rockwool Aktiebolaget, Skövde, Sweden

[21] Appl. No.: 326,316

[22] Filed: Mar. 21, 1989

[30] Foreign Application Priority Data

Mar. 31, 1988 [SE] Sweden .............................. 8801206

[51] Int. Cl.$^5$ .............................................. B08B 5/04
[52] U.S. Cl. ........................................ 134/21; 15/302
[58] Field of Search ...................... 134/1, 21; 15/302; 83/23, 29

[56] References Cited

U.S. PATENT DOCUMENTS

| 2,719,336 | 10/1955 | Stotler | 83/23 |
| 4,207,667 | 6/1980 | D'Angelo | 83/23 |
| 4,333,369 | 6/1982 | McCort | 134/21 |
| 4,437,370 | 3/1984 | Philipp | 83/23 |
| 4,715,078 | 12/1987 | Howard | 139/21 |

Primary Examiner—Asok Pal
Assistant Examiner—Ourmazd S. Ojan
Attorney, Agent, or Firm—Nilles & Nilles

[57] ABSTRACT

A method and apparatus for manufacturing individual plates from a mineral wool mat while minimizing the spread of loose fibers. The method comprises the steps of cutting the mat into individual plates, forming the plates into a pile, establishing a region of vacuum for exhausting air from areas adjacent the sides of the pile and causing movement between the pile and the vacuum to vacuum the sides of the pile. The apparatus for performing the method includes a cutting device for cutting the mat into individual plates, a stacking device for combining the cut plates into a pile of plates, a vacuum device positioned to establish a vacuum for withdrawing air and loose fibers from the sides of the pile, and a conveyor for causing relative movement between the pile and the vacuum device.

17 Claims, 5 Drawing Sheets

METHOD AND APPARATUS FOR VACCUM CLEANING A PILE OF MINERAL WOOL PLATES

The present invention relates to method and an apparatus for the manufacture of mineral wool plates by dividing a continuous mineral wool mat into pieces having the same mutual length and width, said method and apparatus being useful in reducing the spreading of fibers and other particles from the edges of mineral wool plates by using suction slot apparatus or a corresponding means for exhausting air from the area adjacent the mineral wool surfaces so that loose fibers and other particles are brought with the air and into the exhaust slot or slots.

BACKGROUND OF THE INVENTION

When handling mineral wool products large or small amounts of dust are formed, which dust includes, among other things, fibers. It is a general aim in the work environement to minimize the amount of dust, including fibrous dust, to which the working persons are exposed, and the present invention is intended to solve this problem.

The invention is based on studies of the mechanisms which cause origin of dust and also the mechanisms which can be used to prevent spreading of dust. These studies have shown that the air-borne dust which is produced when handling mineral wool mainly comprises thin, short mineral fibers. The studies also have shown that the air-borne fibers and other particles which are produced emanate from the surfaces of the mineral wool products.

In the manufacture of mineral wool a melted mineral material is fabricated into fibers and formed by one or several steps into a continuous mineral wool mat having flat top and bottom surfaces. The main part of the mineral wool fibers is bound by means of a binder. The binder is added during the fabrication process, and the binder is hardened as the mineral wool mat is moved through a hardening furnace in which the mat also is given its final thickness. Upon leaving the hardening furnace the mat of mineral wool has a more or less solid shape and a fixed thickness. Said mineral wool mat is then divided into several pieces. This is done in several operations. Practically without exception the edges are cut clean by means of edge saws and the mat is then cut into pieces of predetermined length by means of a cutting machine. The cutting machine may be of guillotine type or may be formed with one or more rotating saw blades which are movable across the mineral wool path. In most cases the mineral wool mat is also divided in the longitudinal direction by means of a partition machine so that the mat is divided into two or more narrow mats moving aside of each other. In some cases the mat may also be split into two or more thicknesses by one or more band saws making horizontal cuts in the mineral wool mat thereby splitting or stripping same into several thinner mats each lying directly on top of the other.

Generally there are no serious problems in vaccum cleaning the upper surface and the bottom surface of the mineral wool mat for rmeoving dust and loose fibers. Also the edge surfaces which are formed when the edges are cut are easy to reach with a vacuum cleaning apparatus. On the contrary it is difficult to vacuum clean the partition cuts, and in particular the cross cuts, for the purpose of removing particles. It has been suggested that the different mats, which are formed when the mineral wool mat is "partition divided", should be moved apart so that a vacuum cleaning apparatus can be introduced in the space thereby formed between the mats. Said method, however, has not really come into practical use. Irrespective how this problem is solved it can be stated that vacuum exhausting of dust and loose fibers from the cross cut extending perpendicularly to the moving direction of the mat causes much greater problems. Modern manufacturing lines for mineral wool operate at speeds of 25 m/min or more. After cross cutting the cut apart pieces are often accelerated and thus the moving speed becomes still higher. It is very difficult to arrange an effective vacuum cleaning of surfaces which are perpendicular to the moving direction and moving at such high speeds.

SUMMARY OF THE INVENTION

The present invention is intended to solve the above mentioned problem, and this is accomplished by cutting the mineral wool mat into individual plates which are arranged into a pile of plates, whereupon suction slots or suction nozzles or similar apparatus are moved over all four sides of the pile. It is thereby possible to cause the suction slots to move in relation to a pile which is standing still, or to cause a pile to move past fixed mounted suction slots or similar apparatus.

In order to improve the flexibility so that it is possible to treat piles of different size plates in the same apparatus the suction slots are preferably arranged in pairs so that two oposite sides of the pile are treated in a first step and thereafter the two remaining sides are treated in a second step, whereby the treatments in each step with are done with separate sets of suction slots. In order to bind the fibers and other particles which are left in the mineral wool after the vacuum cleaning, but which still form a potential source of dust, the mineral wool surfaces which have been vacuum cleaned are preferably treated with a dust binding substance.

The best total effect is obtained if both flat surfaces of the mineral wool plates to be piled are vacuum cleaned before being piled, and that said surfaces are eventually also treated with a dust binding substance.

In high efficiency plants it may be good to have the mineral wool plates form a continuous pile which is then continuously moved past a stationary vacuum cleaning apparatus which vacuum cleans the edge surfaces of the plates. In this embodiment the plates are preferably turned up on edge so that the pile is placed horizontally and the mineral wool plates consequently are standing vertically in the pile.

In less efficient production plants it may, on the other hand, be preferred to form piles of plates with each pile comprising the predetermined number of plates that a final mineral wool plate package is to contain for shipping. In particular in available plants, in which there is no free floor space for additional installations it is preferred to have the pile of plates move vertically up and then, possibly after some side displacement, vertically down again. Thereby the vacuum cleaning of the edges and any eventual treatment with a dust binding substance is made during the vertical movement and, in an actual case, also during the side displacement.

In this case an especially suitable method is to execute the vacuum cleaning while the pile is moving vertically upwards. Then the pile is moved sideways and then back vertically down to a place relatively close to the place from where the movement vertically upwards started. In this case a possible treatment of the mineral wool with a dust binding substance is preferably made while the pile is moving downwards. In some cases the local conditions may be such that the first vertical movement is more easily made in the direction downwards, whereupon the second vertical movement is made in the direction upwards.

BRIEF DESCRIPTION OF THE DRAWINGS

Now the invention will be described more closely with reference to five principle figures, in which FIG. 1 diagrammatically shows a side view of an apparatus according to the invention.

DESCRIPTION OF THE PREFERRED EMBODIMENTS

Figure 1:
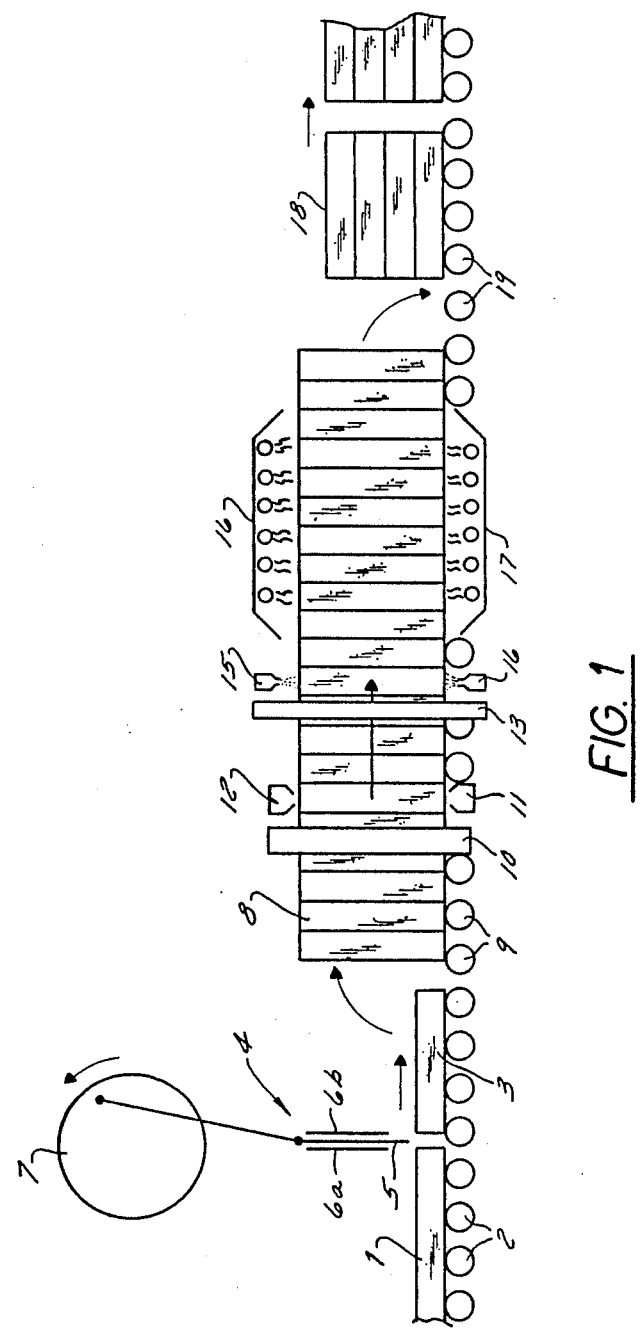

FIG. 1 shows a mineral wool mat 1 which is moved on a roll conveyor 2. The mineral wool mat 1 is cut into short pieces, named plates 3, by means of a cutting apparatus 4, which in FIG. 1 is symbolized by a guillotine blade 5 which is movable between two guide plates 6a and 6b and which is driven by an intermittently rotatable eccentric apparatus 7.

By means of a conventional apparatus which is not shown in the drawing the plates 3 are turned to edge standing position by being turned 90°, whereby said plates form a horizontal, continuous pile 8 of plates standing on their edge. The pile 8 is moved with a speed which matches the production line speed by means of a roll conveyor 9. Vacuum cleaning slots 10 are mounted at the two vertical sides of the pile for exhausting or sucking off dust and loose fibers from the vetical sides of the pile, and some distance downstream from said slots 10 additional vacuum cleaning slots 11, 12 are mounted for vacuum cleaning the top and bottom surfaces of the pile 8. After the four sides of the pile 8 have been vacuum cleaned a dust binding substance is sprayed onto the two vertical sides of the pile by means of a pair of nozzles 13, and then the top surface and the bottom surface are sprayed with a dust binding substance by means of nozzles 14 and 15 respectively. The dust binding substance may for instance be a mineral oil diluted with some solvent. The dust binding substance is then dried by exposing the surfaces to infrared rays as symbolized in FIG. 1 by the heating and radiation apparatus 16 and 17 at the upper side and the bottom side of the pile respectively. In practice, of course, the radiation apparatus are arranged so as to also expose the vertical sides of the pile to the radiation.

After the dust binding substance has become dried the continuous pile 8 is broken up into individual pile units 18 which are later to form a package and which are prosecuted on the roll conveyor 19.

Figure 2:
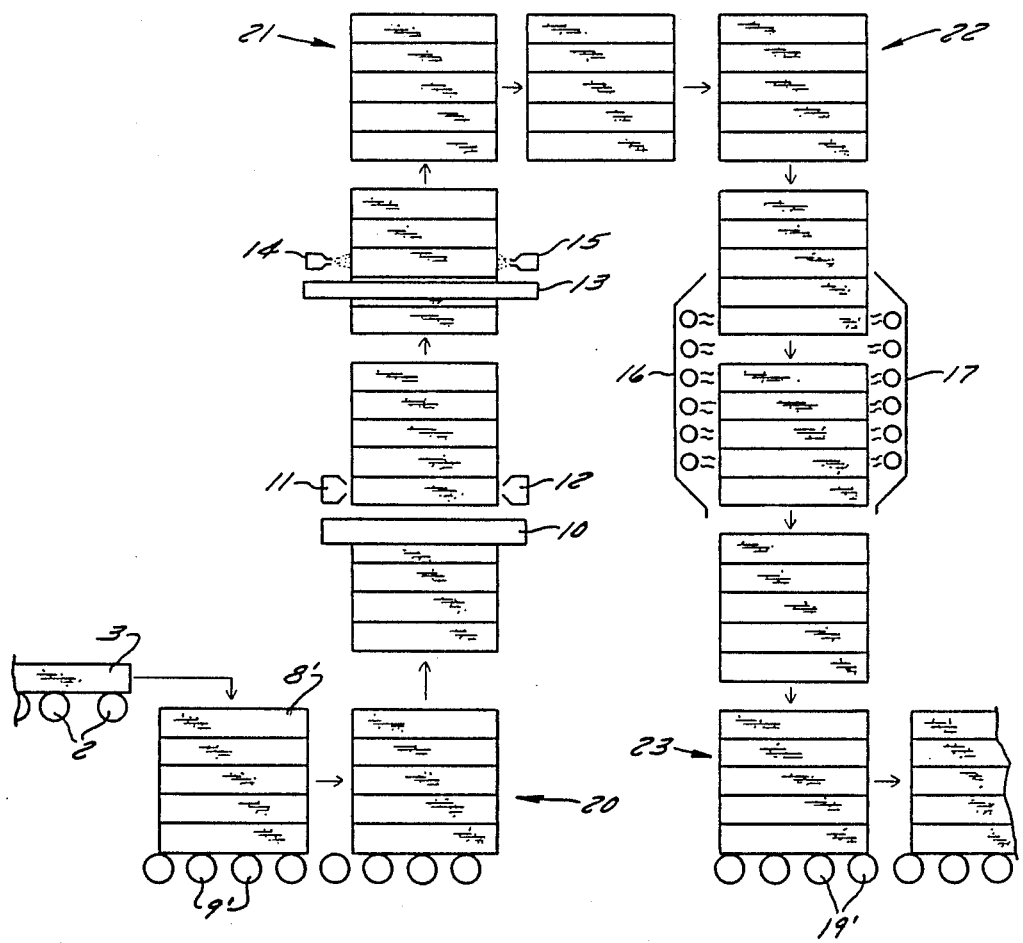
FIG. 2 shows a detail of an alternative embodiment of the invention having an upwards-sideways-downwards moving vacuum cleaning function.

In FIG. 2 mineral wool plates 3 supplied on the roll conveyor 2 have been piled into a pile 8' by means of a conventional piling apparatus which is not shown in the drawing. When the pile 8' is ready it is moved by the roll conveyor 9' to a new position symbolized by the pile standing in the position 20. From this position the pile is moved vertically up past the suction nozzles 10 which vacuum clean the surfaces of the pile extending in the plane of the drawing, and suction nozzles 11 and 12 which vacuum clean the two further sides of the pile. After the vacuum cleaning process the pile 8' is moved further upwards past the nozzles 13, 14 and 15 which apply a dust binding substance on the edge surfaces of the pile 8'. From the position marked with the arrow 21 the piles are moved horizontally to a position marked with the arrow 22, and from there the piles are moved downwards past the radiation apparatus 16 and 17 which provide a drying or evaporation of the dust binding substance which has been sprayed onto the pile surfaces. After having passed the radiation apparatus the piles are moved further down to a position marked with the arrow 23 and are then moved out of the apparatus by the roll conveyor 19'.

Figure 3:
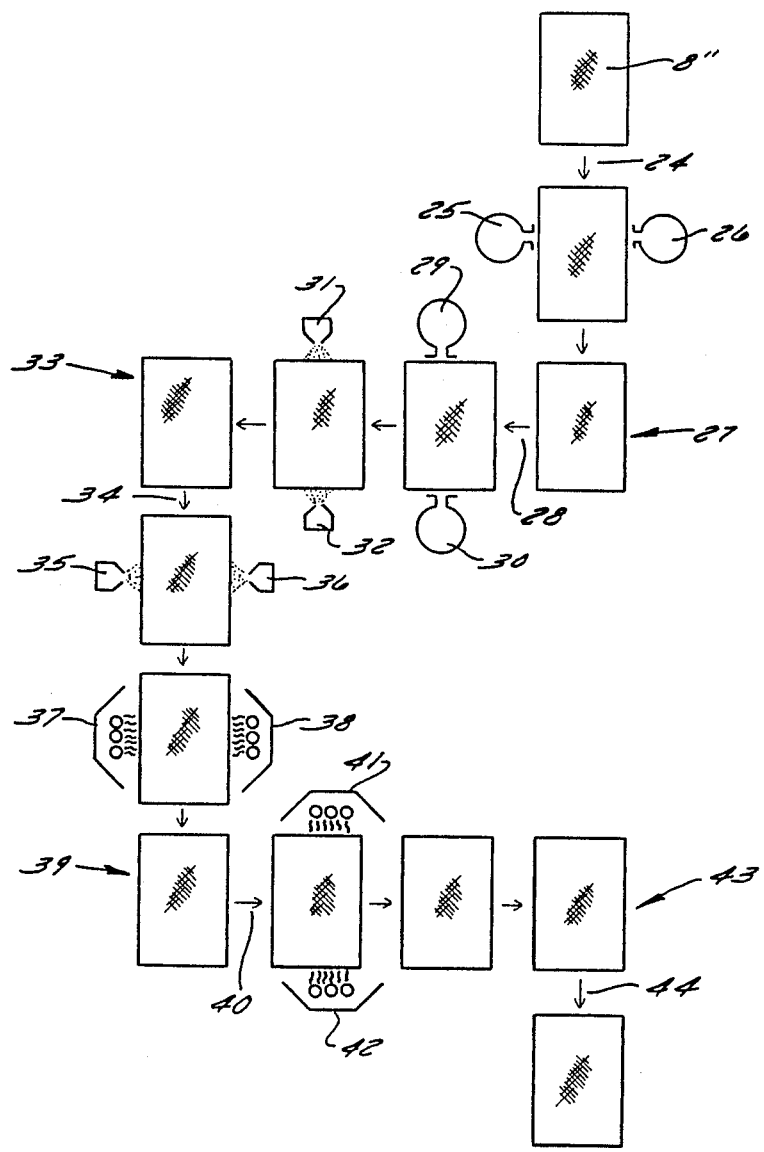
FIGS. 3 and 4 show a couple of further alternative arrangements of an apparatus according to the invention.

FIG. 3 illustrates another method of executing the invention.

FIG. 3 basically shows a pile 8" of mineral wool plates which is moved in the direction of the arrow 24 in between two suction slots 25 and 26 which vacuum clean the edge surfaces of the pile 8" which are parallel to the moving direction. The pile 8" is then moved on to the position marked by the arrow 27. From this position the pile is moved at a right angle in the direction of the arrow 28, past suction slots 29 and 30 which vacuum clean the two other surfaces of the pile 8". After the pile has been vacuum cleaned it is moved past the two nozzles 31 and 32 which spray a dust binding substance onto the edge surfaces which have just been vacuum cleaned. The pile is then moved on to the position marked with the arrow 33. From this position the pile is moved at a right angle in direction marked by the arrow 34, past two nozzles 35 and 36 respectively, which cover the two further edge surfaces with a dust binding substance. The pile is further moved past a first radiation apparatus 37, 38, in which the dust binding substance is dried or evaporated, for instance by means of infrared radiation, and then to the position marked by the arrow 39. From this position the pile is moved at a right angle, marked by the arrow 40, past a second set of radiation apparatus 41 and 42, which dry or evaporate the dust binding substance on the two further sides of the pile. The pile is then moved in the same direction to the position marked with the arrow 43 and then once again at a right angle as marked with the arrow 44 and into the plant.

Figure 4:
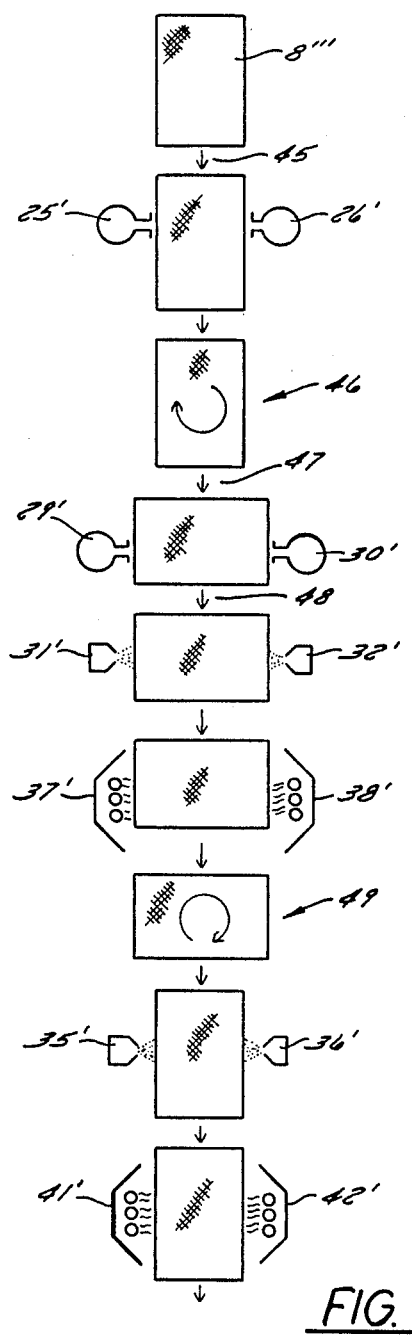

FIG. 4 shows a corresponding apparatus, in which the change of moving directions provided for in the arrangement according to FIG. 3 is accomplished by rotations of the pile. In FIG. 4 reference numeral 8''' symbolizes the row of incoming piles. The pile is moved following the arrow 45 past the vacuum cleaning slots 25' and 26', which vacuum clean the longitudinal, vertical surfaces. In position 46 the pile is rotated 90° and is moved on in the direction of the arrow 47 past the vacuum cleaning slots 29' and 30', which vacuum clean the two further edge surfaces of the pile. Then the pile is moved on in the direction of the arrow 48 past the two nozzles 31' and 32' respectively which over the said vacuum cleaned surfaces with a dust binding substance which is then dried by a first step of radiation apparatus 37' and 38'. In the position marked with the arrow 49 the pile is once again rotated 90° and is then allowed to pass the nozzles 35' and 36' which cover the two further edge surfaces of the pile with a dust binding substance which is then dried by a second set of radiation apparatus 41' and 42'.

Figure 5:
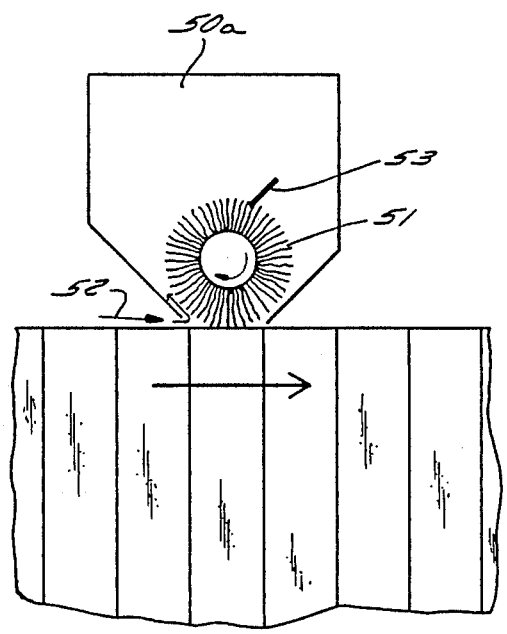
FIGS. 5 and 6 show more in detail two different arrangements for vacuum cleaning of loose fibers and particles from the edges of mineral wool plates.

FIG. 5 shows a cross section through an exhaust slot means 50a for mechanically treating and exhausting loose fibers and particles from the edge surfaces of a pile 8 of mineral wool plates. The exhaust slot means 50a comprises a cylindric brush 51 rotating in the opposite direction to the moving direction of the mineral wool piles and which brushes up loose fibers from the surface. Air is at the same time sucked into the exhaust slot over the narrow air slot which is formed at least on the rear side of the exhaust slot as marked with the arrow 52. The loosened fibers and particles are then exhausted through an exhaust pipe, not shown, of the exhaust slot means 50a. Fibers and particles can easily stick to the brush and for removing same it is possible to have the brush rotate against a plate 53 mounted at or adjacent the upper side of the brush and which plate releases fibers and particles which have become stuck to the brush.

Figure 6:
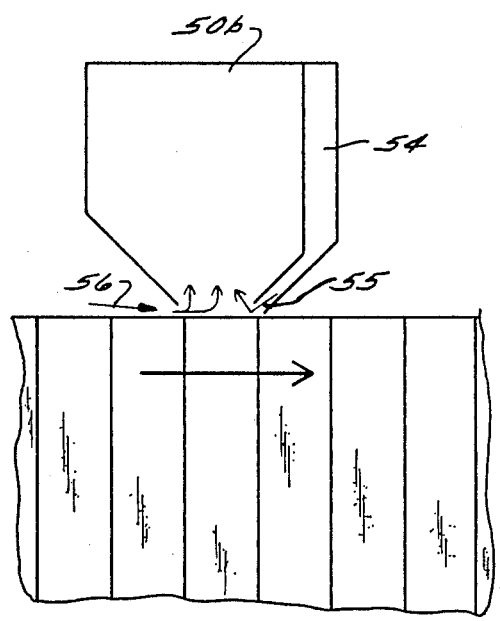

FIG. 6 shows an alternative exhaust slot means 50b for releasing or lifting off and exhausting loose fibers and particles from the edge surfaces of a pile 8 of mineral wool plates. In this case the exhaust slot means 50b comprises a blowing box 54 which directs a flow of air 55 obliquely downwards to the edge surface of the pile 8 and which thereby releases and whirls up loose fibers and particles. Also in this case the exhaust slot means 50b is connected to an exhaust pipe, not shown which exhausts such loose fibers and particles together with the air which is introduced through the air slot at the rear side of the exhaust slot means as indicated with the arrow 56.

It is also possible to combine the apparatus according to FIG. 5 and FIG. 6 in the same unit, whereby said unit will operate both by blowing action and by brush action.

I claim:

1. A method for manufacturing individual plates (3) from a mineral wool mat having main planar surfaces to minimize the spread of loose fibers and other particles from said plates comprising the steps of
   A. cutting said mat into individual plates each having marginal edges of the same length and end edges of the same width with each of said edges presenting an edge surface;
   B. placing said main surfaces of each plate into aligned face-to-face relation with those of adjacent plates to form a pile which has four sides each composed of a plurality of said mineral wool edge surfaces;
   C. establishing a vacuum cleaning slot means for withdrawing and exhausting air from areas closely adjacent said sides of said pile; and
   D. causing relative movement between said pile and said vacuum cleaning slot means to vacuum clean said sides of said pile.

2. A method according to claim 1 wherein said vacuum cleaning slot means comprise a first set of two spaced apart vacuum intake slots and a second set of two spaced apart vacuum intake slots and wherein in step D said first set of slots is positioned to vacuum clean two of said four sides of said pile and said second set of slots is positioned to vacuum clean the remaining two sides of said pile.

3. The method according to claim 1 wherein, during step D, said edge surfaces are agitated by means of a brush or an air jet.

4. The method according to claim 1 comprising the additional step of

E. treating said edge surfaces of said pile with a dust binding substance after said vacuum cleaning of step D has been completed.

5. The method according to claim 4 wherein:
   in step A said mineral wool mat, prior to cutting, lies in a horizontal plane;
   in step B said plates, after being cut, are moved from said horizontal plane to stand vertically on edge in said pile;
   in step C said vacuum cleaning slot means are mounted in a stationary position;
   in step D said pile is moved past said stationary vacuum cleaning slot means; and
   wherein said method includes the additional steps of:
   F. moving said pile, after it has been treated with a dust binding substance in step E, past one or more radiation apparatus for drying said dust binding substance;
   G. orientating said dried plates back to said horizontal plane; and
   H. assembling said horizontal plates into individual freestanding pile units each having a predetermined member of plates that will constitute a completed package for subsequent shipment.

6. A method according to claim 1 wherein said main surfaces of said mat are vacuum cleaned and treated with a dust binding substance prior to carrying out step B.

7. A method according to claim 1 wherein
   in step B said pile is divided into individual pile units prior to vacuuming;
   in step C said vacuum cleaning slot means are stationary; and
   in step D said individual pile units are moved past said stationary vacuum cleaning slot means.

8. The method according to claim 7 wherein said vacuum cleaning slot means comprise a first set of two spaced apart vacuum intake slots and a second set of two spaced apart vacuum intake slots and wherein in step D said individual pile units are moved past said first set of two vacuum intake slots, then rotated 90° and moved past said second set of two spaced apart vacuum intake slots to vacuum all four sides of each pile unit.

9. The method according to claim 1 wherein:
   in step B said plates are oriented horizontally and placed into a plurality of individual pile units, each of which comprises a predetermined number of plates that will constitute a completed package for subsequent shipment; and
   in step D said individual pile units are moved past said vacuum cleaning slot means.

10. In an apparatus for executing the method according to claim 1 which includes means for cutting a mineral wool mat into individual plates each having marginal edges of the same length and end edges of the same length with said edges each presenting an edge surface, the improvement comprising:
    plate combining means for successively combining said cut plates into a plate pile having four sides each composed of a plurality of said mineral wool edge surfaces;
    vacuum means for establishing a vacuum positioned to withdraw and exhaust air from areas closely adjacent said pile sides; and
    movement means for causing relative movement between said pile and said vacuum means to successively vacuum clean dust particles and loose fibers from said four sides of said pile.

11. An apparatus according to claim 10 further comprising:
   application means for applying a dust binding substance on said four sides; and
   drying means for drying said dust binding substance after it has been applied to said four sides.

12. An apparatus according to claim 11 wherein said mat is initially in a horizontal plane and further comprising:
   turning means for orientating said plates to stand on edge prior to vacuum cleaning; and
   means for moving said plates down to said horizontal plane after treatment into a pile and for arranging said pile into a succession of freestanding pile units.

13. An apparatus according to claim 11 further comprising means for agitating said edge surfaces of said pile during operation of said vacuum means.

14. An apparatus according to claim 11 wherein
   said plate combining means includes means for arranging said pile into individual pile units; and
   said movement means further comprises means for moving said individual pile units successively, in an upward direction, a sideways direction and a downward direction.

15. An apparatus according to claim 11 wherein:
   said plate combining means includes a means for arranging said pile into individual units; and
   said movement means further comprises means for moving said individual pile units successively, in a downward direction, in a sideways direction, and in an upward direction.

16. An apparatus according to claim 11 wherein:
   said plate combining means includes a means for arranging said pile into individual units; and
   said movement means further comprising means for moving said individual pile units horizontally in one straight forward direction, sideways relative to said one direction, in spaced parallel relation to said one straight forward direction, and sideways in an opposite direction with respect to said direction of said first sideway movement.

17. An apparatus according to claim 11 wherein:
   said plate combining means includes a means for arranging said pile into individual pile units;
   said vacuum means include first and second sets of spaced apart vacuum slots, said second set spaced from said first set along a straight line of travel which is followed by said units; and
   said movement means further comprises means for moving said individual pile units along said straight line of travel, past said first set of vacuum slots, for then rotating each of said pile units 90°, for continuing to move said rotated pile unit along said straight line of travel past said second set of second vacuum slots, and for then rotating said previously rotated pile unit back to its original position.

* * * * *